United States Patent [19]

Schultz

[11] Patent Number: 4,779,684

[45] Date of Patent: Oct. 25, 1988

[54] METHOD AND APPARATUS FOR EXTRACTING PLANT STALKS AND FOR RESHAPING BEDS

[76] Inventor: Charles R. Schultz, Rte. 1, Box 115A, Coolidge, Ariz. 85228

[21] Appl. No.: 58,036

[22] Filed: Jun. 4, 1987

Related U.S. Application Data

[63] Continuation-in-part of Ser. No. 874,795, Jun. 13, 1986, abandoned.

[51] Int. Cl.⁴ .................. A01D 43/12; A01B 43/00; A01B 79/00
[52] U.S. Cl. ..................... 171/62; 172/575; 172/740; 172/1
[58] Field of Search ............ 172/183, 169, 156, 575, 172/574, 161, 739, 740, 572, 620, 599; 171/67, 10, 62, 58, 116, 125, 88; 56/500, 502, 327 A

[56] References Cited

U.S. PATENT DOCUMENTS

| | | | |
|---|---|---|---|
| 747,759 | 12/1903 | Packham | 111/88 |
| 783,395 | 2/1905 | Ashurst | 111/88 |
| T862,011 | 5/1969 | Koronka | 111/88 |
| 1,081,201 | 12/1913 | Blunck | 171/62 X |
| 2,549,185 | 4/1951 | Fitch | 171/67 X |
| 2,651,905 | 9/1953 | Schlueter | 171/58 |
| 3,058,531 | 10/1962 | Beaman | 172/575 X |
| 3,499,495 | 3/1970 | Past | 172/575 X |
| 4,015,667 | 4/1977 | Ruozi | 172/194 |
| 4,295,532 | 10/1981 | Williams | 172/574 |
| 4,489,787 | 12/1984 | Gary | 172/574 |
| 4,585,073 | 4/1986 | Mayeda | 172/169 |

FOREIGN PATENT DOCUMENTS

| | | | |
|---|---|---|---|
| 165742 | 6/1954 | Australia | 172/574 |
| 1480643 | 4/1967 | France | 111/88 |
| 301207 | 11/1928 | United Kingdom | 172/574 |
| 1150723 | 4/1969 | United Kingdom | 111/88 |

OTHER PUBLICATIONS

Econo-Till 3000/3500 Advertizing Brochure of Hiniker Co., Monkato MN.

*Primary Examiner*—Richard J. Johnson
*Attorney, Agent, or Firm*—Nissle & Leeds

[57] ABSTRACT

Apparatus for removing upstanding plant stalks from the ground and for mulching the stalks. The apparatus includes simplified disk mechanisms which can be adapted both to cut and mulch plant stalks.

7 Claims, 3 Drawing Sheets

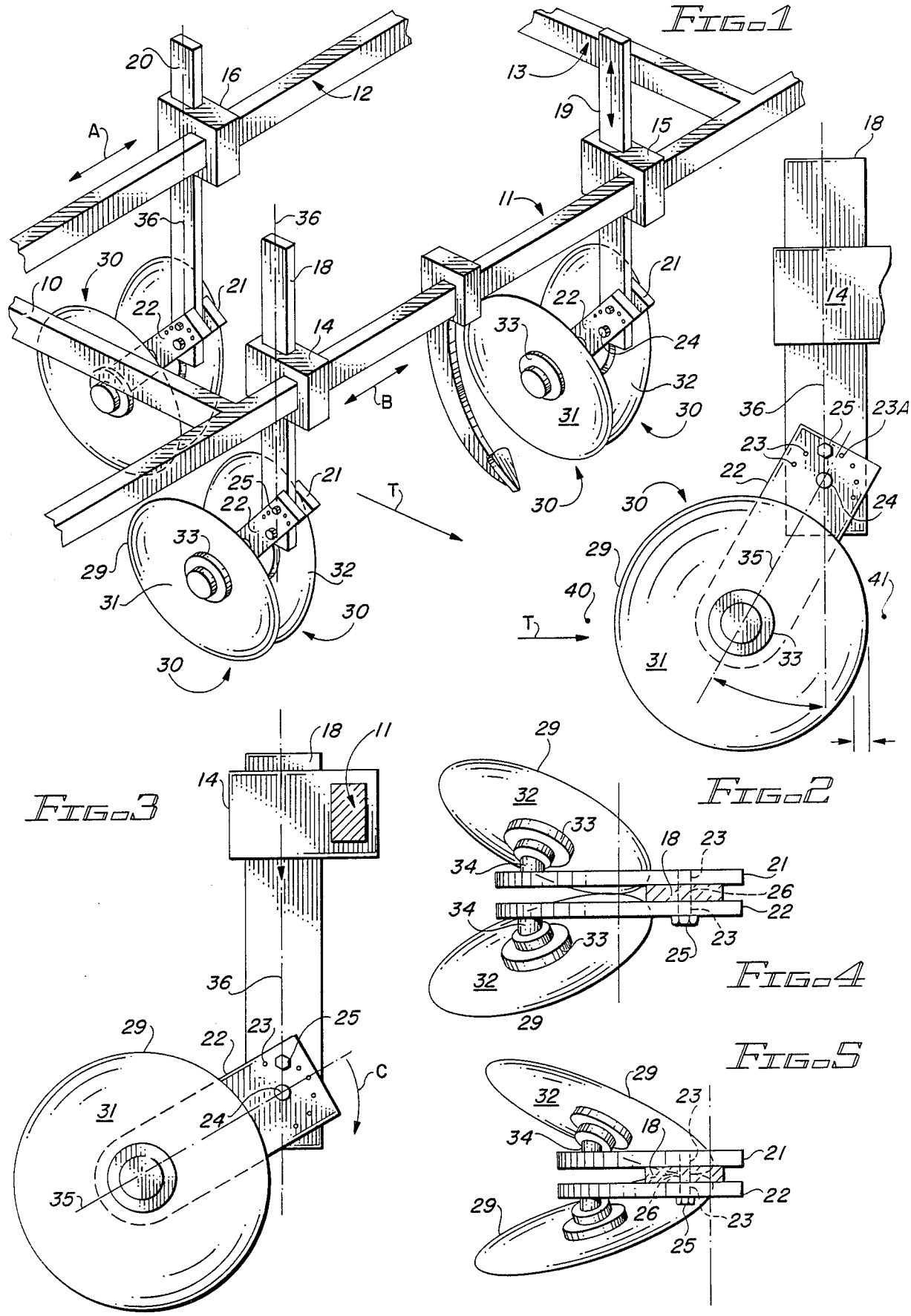

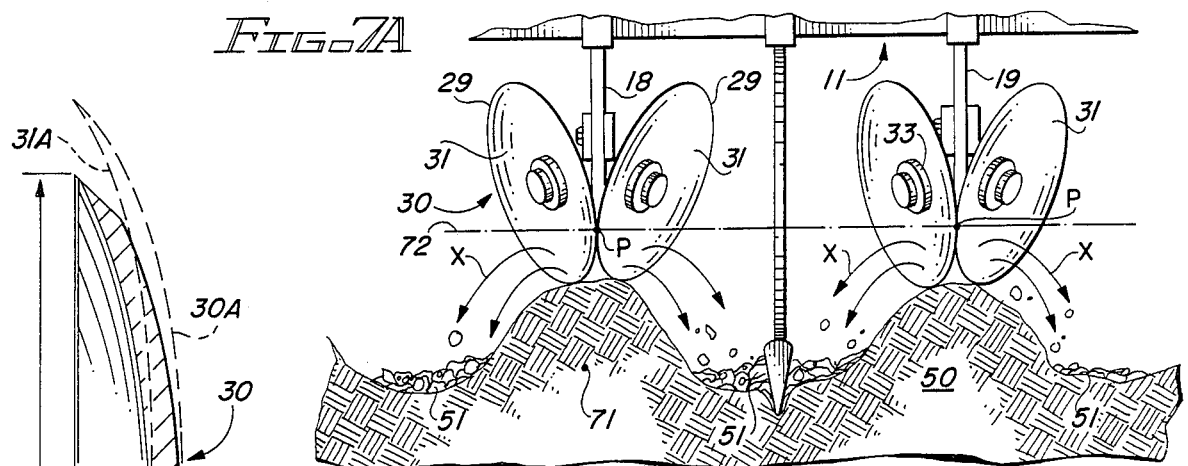
FIG.-7A
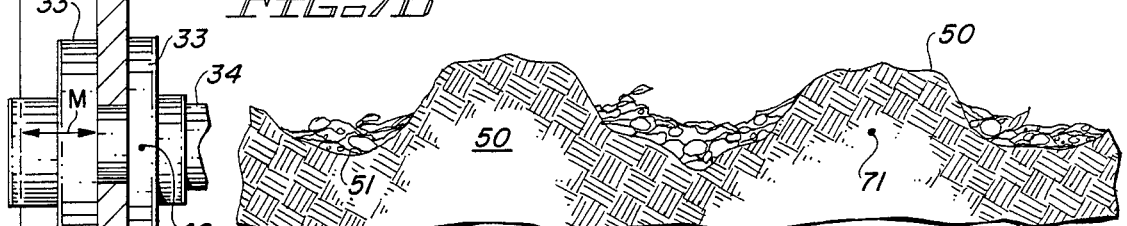
FIG.-7B
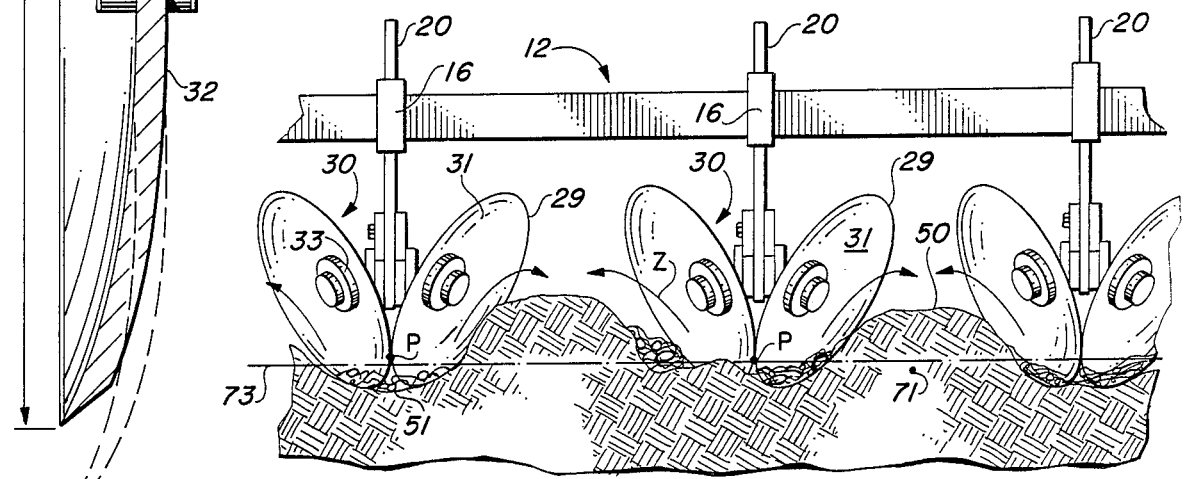
FIG.-7C
FIG.-6
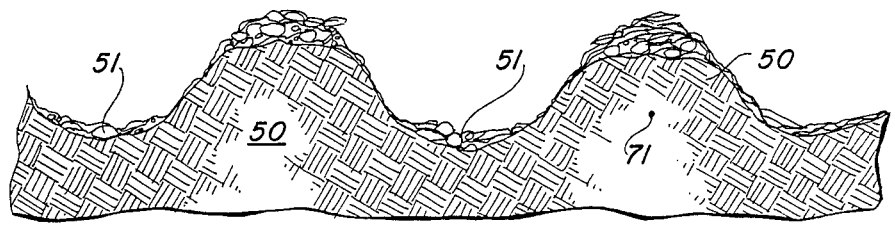
FIG.-7D

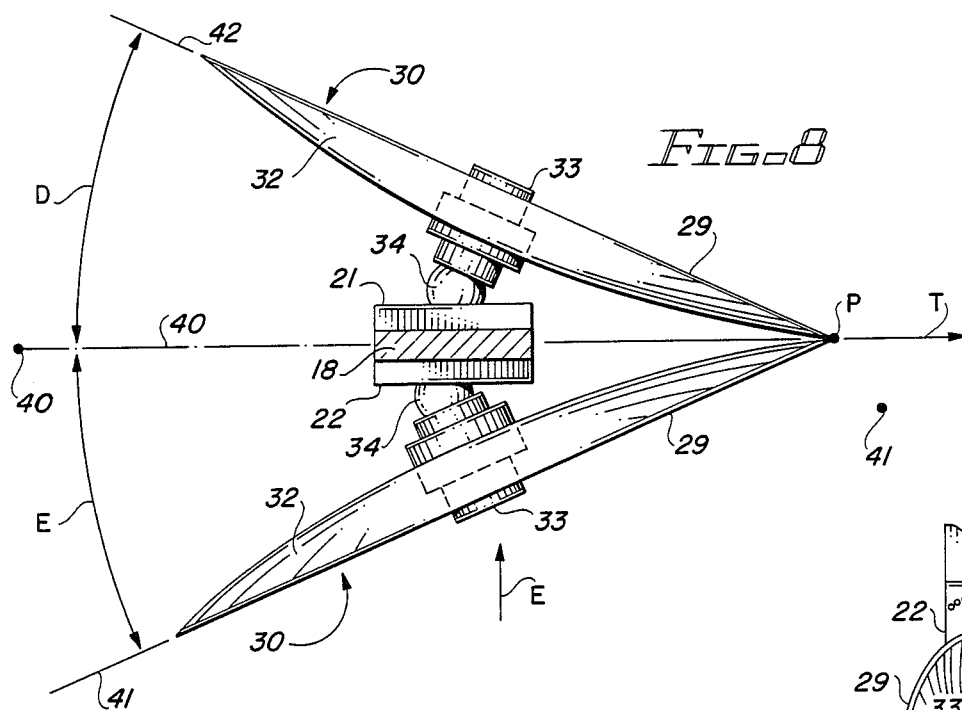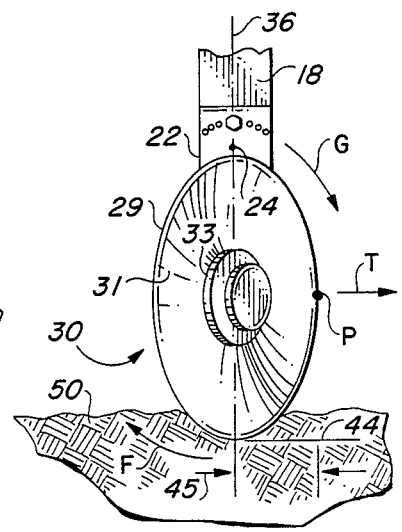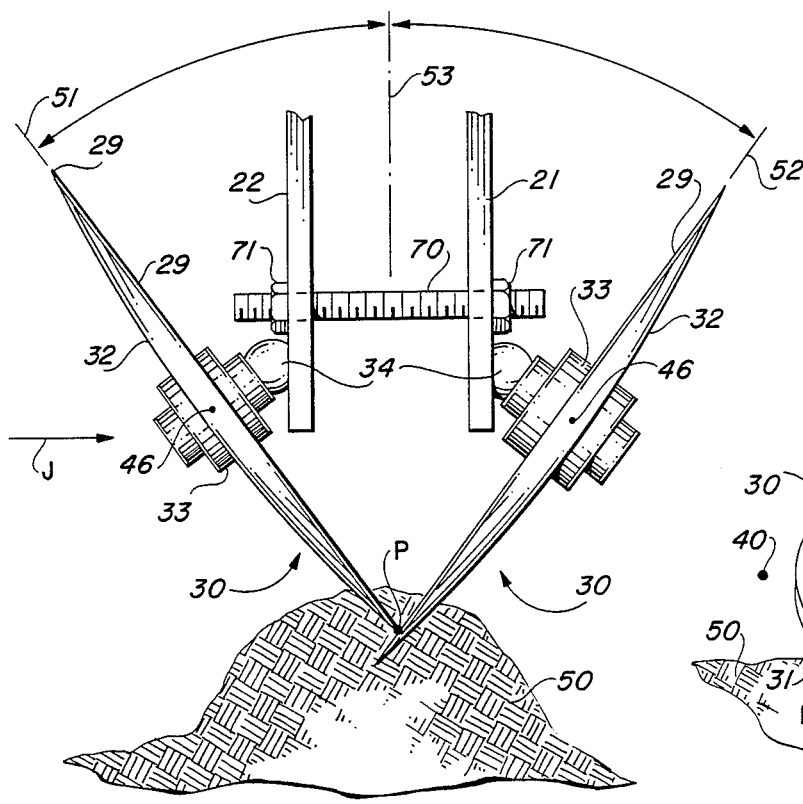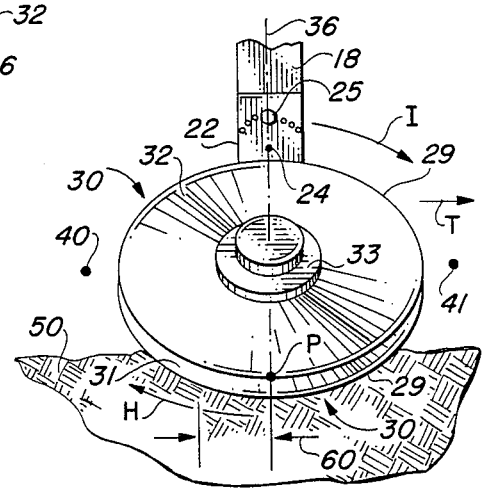

METHOD AND APPARATUS FOR EXTRACTING PLANT STALKS AND FOR RESHAPING BEDS

This is a continuation-in-part of my application Ser. No. 874,795 for APPARATUS FOR EXTRACTING AND SHREDDING PLANT STALKS, filed June 13, 1986, now abandonded.

This invention relates to agricultural machinery.

More particularly, the invention relates to apparatus utilized to remove upstanding plant stalks from the ground and mulch the stalks, the apparatus including a simplified disk mechanism which cuts and lifts plant stalk roots.

In still another respect, the invention relates to stalk removal apparatus which removes upstanding plant stalks from the beds of a field and restores the shape of the beds without damaging drip irrigation tubing which is buried near the surface of the beds.

In another important respect, the invention pertains to plant stalk removal and shredding apparatus which utilizes a ground engaging colter pair to cut the roots of stalks, each colter in the pair being canted away from an imaginary vertical axis between the pair such that the pair is in V-shaped relationship with one another and the outer peripheral cutting edge of one colter continually contacts and rolls over the other colter at a point beneath the surface of the ground as the colters rotate while the apparatus travels along the ground, the colters being mounted on the apparatus such that the centerpoints of the colters and the points at which the colters contact one another can be simultaneously moved along arcs lying in imaginary vertical planes so that the angle of attack into the ground of the peripheral cutting edges of the colters can be altered.

In yet another important respect, the invention pertains to plant stalk removal apparatus in which the tendency of the stalk root cutting blades to travel downwardly into the ground to a greater than desired depth can be readily controlled to minimize the likelihood that the cutting blades will contact and damage drip irrigation tubing buried beneath plant stalks which are removed from the ground by the apparatus.

Machinery for removing plant stalks from the ground is well known in the art. See, for example, U.S. Pat. Nos. 2,549,185 to Fitch; 3,160,214 to Ruozi; 1,081,201 to Blunck; 3,898,752 to Ulve; 1,117,314 to Blunck; 2,337,355 to Spell; 4,445,557 to Peters; 2,660,013 to Priestley; 2,777,267 to Thompson; 2,651,905 to Schlueter; 1,862,011 to Koronka; 4,015,667 to Ruozi; 1,185,785 to Ferguson; 783,395 to Ashurst; 747,759 to Packham and French Pat. No. 1,480,643 to Imperial. The machine disclosed in U.S. Pat. No. 4,015,667 to Ruozi is representative of conventional plant stalk removal equipment. During operation of the Ruozi machine, disks 102, 104 clear a path along the ground for plow blades 28, 30 which are positioned beneath and rearwardly of spaced longitudinal pairs 14, 16 of lifting rollers. See FIGS. 1 and 5 of Ruozi. Guides 20, 22 (See also FIG. 2) direct upstanding stalks between spaced rollers 18 of roller units 14, 16. Plant stalks are contacted and upwardly displaced by roller pairs 14, 16 while plow blades 28, 30 loosen the roots of the stalks into rotating blade cutting units 116, 118 (See also FIG. 6). As shown in FIG. 5 of Ruozi, stalks shredded by blade units 116, 118 are directed rearwardly through deflector shield 128 and onto the ground. The Ruozi machine also includes bed reshaping assembly 48.

There are several disadvantages associated with the Ruozi machine. In addition to being complicated, the machine is not, because the depth of stationary blade assemblies 28, 30 in the ground tends to vary, well suited for removing plant stalks from fields in which drip irrigation tubing has been installed. The depth of blade assemblies 28, 30 in the ground varies because the downward cant of blades 40 causes a downward pull to be exerted on the blades as they move through the ground. This downward pull draws blades 40 into the ground, especially when wheels 146 travel through a rut or sink into a soft area in the ground. Since plow blades 40 tend to pull and tear the roots of a plant stalk, blades 40 may, by upwardly forcing the roots of a plant stalk, pull out drip irrigation tubing engaged by root strands which have grown to a depth beneath that of blades 40. Cutting plant roots is normally more efficient than severing the roots by pulling, extending and tearing the roots. Blades 40 also dig up a substantial amount of dirt with plant roots. The pulling and tearing of plant roots by blades 40 and the substantial amount of dirt the blades dig up along with the roots increases the amount of upward pull which must be generated by longitudinal roller pairs 14, 16 during operation of the Ruozi apparatus.

Accordingly, it would be highly desirable to provide improved stalk removal apparatus which would reduce the power required to remove stalk roots from soil; would reduce the number of mechanical components required to efficiently remove plant stalks from the beds in a field; would permit the depth of the root cutting mechanism to be readily controlled; and, would minimize the likelihood that drip irrigation tubing buried in a field would be damaged when the apparatus was used to remove plant stalks from the field.

Therefore, it is a principal object of the invention to provide improved apparatus for removing upstanding plant stalks from the bed in a field and for restoring the shape of the beds after the stalks are removed.

A further object of the invention is to provide improved plant stalk removal apparatus including a simplified mechanism which simultaneously cuts and lifts the roots of plant stalks in the beds of a field.

Another object of the invention is to provide improved stalk removal and mulching apparatus in which the tendency of stalk root cutting blades to angle downwardly into the ground to a greater than desired depth can be readily controlled to minimize the likelihood that the cutting blades will contact and damage drip irrigation tubing buried beneath upstanding plant stalks which are being removed from the ground by the apparatus.

These and other, further and more specific objects and advantages of the invention will be apparent to those skilled in the art from the following detailed description thereof, taken in conjunction with the drawings, in which:

FIG. 1 is a perspective view illustrating the bed leveling and reshaping mechanisms carried on the frame of a plant stalk removal machine constructed in accordance with the invention;

FIG. 2 is a side view of one of the bed leveling and reshaping mechanisms of FIG. 1 illustrating the mode of operation thereof;

FIG. 3 is a side view of one of the bed leveling and reshaping mechanisms of FIG. 2 further illustrating the mode of operation thereof;

FIG. 4 is a top view illustrating the bed leveling and reshaping apparatus of FIG. 3;

FIG. 5 is a top view illustrating the bed leveling and reshaping apparatus of FIG. 2;

FIG. 6 is a section view illustrating an arcuate disk utilized in the practice of the invention;

FIG. 7A is a front elevation view illustrating the travel of bed leveling mechanisms of the invention over and through the beds of a field;

FIG. 7B is a front elevation view illustrating the beds and furrows of the field of FIG. 7A after the bed leveling mechanisms have passed through the beds;

FIG. 7C is a front view elevation illustrating the travel of bed shaping mechanisms through the furrows of the field of FIG. 7B;

FIG. 7D is a front view elevation illustrating the field of FIG. 7C after the bed reshaping and contouring mechanisms have passed through the furrows of the field;

FIG. 8 is a top view illustrating the bed leveling and reshaping mechanism of FIG. 2 with the disk pair in their primary reference position;

FIG. 9 is a side elevation view illustrating the disk pair of FIG. 8;

FIG. 10 is a front elevation view illustrating the plant stalk root cutting mechanism with the disks or colters in their primary reference position; and, FIG. 11 is a side elevation view illustrating the disk pair of FIG. 10.

Briefly, in accordance with my invention, I provide an improved method for cutting the roots of plant stalks in the bed of a field, for leveling the bed, and for rebuilding and contouring the bed. The method includes the steps of moving root cutting apparatus along the bed in a selected direction of travel; moving bed leveling apparatus along the bed to remove dirt and stalks from the top of the bed into the furrows on either side of the bed; and, moving bed contouring apparatus along at least one of the furrows to move dirt into and shape the bed. The root cutting apparatus includes a frame adapted to be moved along the ground in a selected direction of travel; upstanding arm means mounted on the frame and having a lower end; and, a pair of forwardly canted ground engaging disks each rotatably mounted on the lower end of the upstanding arm means, the disks being mounted on the arm means in V-shaped relationship with respect to one another. Each of the disks upwardly diverges from the other and has an outer circular peripheral cutting edge and a concave inner face and a convex outer face. The cutting edge of one of the disks rotates over and contacts the inner face of the other of the disks beneath the surface of the ground to cut stalk roots and lift cut stalks as the disks rotate along and through the ground when the apparatus is moving in the selected direction of travel. Each of the disks is forwardly canted with respect to a reference position, the reference position of the disks comprising the position in which the point of contact of the cutting edge of one of the disks with the inner face of the other of the disks is generally the lowest point through which the cutting edge of one of the disks passes during rotation thereof. The disks are forwardly canted when the disks are displaced such that the centerpoint of each disks moves upwardly a selected distance along an arc lying in an imaginary vertical plane generally parallel to the direction of travel.

The bed leveling apparatus includes a second frame adapted to be moved along the ground in the selected direction of travel; upstanding second arm means mounted on the second frame and having a lower end; and a pair of forwardly canted ground engaging disks each rotatably mounted on the lower end of the upstanding second arm means. The bed leveling disks each rearwardly diverge from the other and have an outer circular peripheral edge and a concave outer face and a convex inner face. The bed leveling disks rotate through the bed to displace dirt and stalks from the bed outwardly into the furrows on either side of the bed when the bed leveling apparatus is moving in the selected direction of travel. Each of the bed leveling disks is forwardly canted with respect to a bed leveling disk reference position. The bed leveling disk reference position comprises the position in which the point of closest approach of the peripheral edge of one of the bed leveling disks with the peripheral edge of the other of the bed leveling disks is generally at the frontmost point which the peripheral edge of the disk passes during rotation thereof. The bed leveling disks are forwardly canted when the disks are displaced from the bed leveling disk reference position such that the centerpoint of each disk moves downwardly a selected distance along an arc lying in an imaginary vertical plane generally parallel to the direction of travel.

The bed contouring apparatus includes a third frame adapted to be moved along the ground in the selected direction of travel; upstanding third arm means mounted on the third frame and having a lower end; and, a pair of forwardly canted ground engaging disks each rotatably mounted on the lower end of the upstanding third arm means. The bed contouring disks are mounted on the third arm means in V-shaped relationship to one another, each of the bed contouring disks rearwardly diverging from one another, and having an outer circular peripheral edge and a concave outer face and a convex inner face. The bed contouring disks rotate through the furrow to displace dirt from the furrow upwardly onto the bed when the bed contouring apparatus is moving in the selected direction of travel. Each of the bed contouring disks is forwardly canted with respect to a bed contouring disk reference position. The bed contouring disk reference position comprises the position in which the point closest approach of the peripheral edge of one of the bed contouring disks with peripheral edge of the other of the bed contouring disks is generally at the frontmost point which the peripheral edge of the disk passes during rotation thereof. The bed contouring disks are forwardly canted when the disks are displaced from the bed contouring disk reference position such that the centerpoint of each disk moves downwardly a selected distance along an arc lying in an imaginary vertical plane generally parallel to the direction of travel of the apparatus.

Turning now to the drawings, which depict the presently preferred embodiment and best mode of the invention for the purpose of illustrating the practice thereof and not by way of limitation of the scope of the invention, and in which identical reference characters correspond to like elements throughout the several views, FIGS. 1 to 11 illustrate the presently preferred embodiment and best mode of the invention, including a rectangular frame having rectangular horizontally oriented interconnected beams 10, 11, 12 and 13. Collars 14, 15 are slidably mounted on beam 11. Set screws (not visible) are used to secure collars 14 and 15 in a desired position on beam 11. Set screws (not visible) are also utilized to secure collar 16 in position on beam 12.

When the set screws used to secure collar 16 in position on beam 12 are loosened, collar 16 can be slid along beam 12 in the directions of arrow A. When the set screws securing collars 14 and 15 to beam 11 are loosened, collars 14, 15 can be slid along beam 11 in the directions of arrows B. Vertically oriented rectangular bars 18, 19, 20 are slidably received by collars 14–16, respectively. Set screws mounted in collars 14–16 are turned against bars 18–20 to secure bars 18–20 in a desired position in collars 4–16. The lower end of each bar 18–20 carries upstanding arm means. The arm means presently preferably includes a parallel, spaced apart pair of upstanding arms 21, 22. The upper end of each arm 21, 22 has a semicircle of spaced apart bolt receiving apertures 23 formed therethrough and is pivotally attached to one of bars 18–20 by a pin 24. Bolt 25 extends through an aperture 23 in arm 22, through aperture 26 in bar 18, and through an aperture 23 in arm 21 to maintain arms 21 and 22 in a desired orientation on the apparatus of FIG. 1. The position of arms 21, 22 on a bar 18–20 is adjusted by removing bolt 25, simultaneously pivoting arms 21, 22 about pivot pin 24 to the desired position, and reinserting bolt 25 through the appropriate apertures 23 in arms 21, 22 and through aperture 26 in bar 18–20 intermediate arms 21, 22. For example, the position of arm 22 in FIG. 2 can be adjusted to the position of arm 22 in FIG. 3 by removing bolt 25, pivoting arm 22 (and arm 21) about pin 24 to the position shown in FIG. 3, and then reinserting pin 24 through apertures 23 aligned with aperture 26 formed in bar 18.

Bed leveling disk pairs are mounted on arm pairs 21, 22 carried on bars 18, 19. Each bed leveling disk pair includes a pair of disks 30 each having a concave outer face 31 and convex inner face 32. Each disk 30 includes a hug assembly 33 which is rotatably mounted on joint 34 fixedly attached to the lower end of an arm 21 or 22. Each disk 30 has a circular peripheral outer edge 29. Each disk in a disk pair 21, 22 rearwardly diverges from the other disk. In FIG. 2 the normal direction of travel of the bed leveling apparatus is indicated by arrow T. Point 40 is rearward of disk 30; point 41 is forward of disk 30.

Each arm 21, 22 has an elongate centerline or axis 35. Each bar 18–20 has an elongate vertical axis or centerline 36. If pin 25 is removed and an arm pair 21, 22 is rotated about pin 24 until the arm pair is generally vertical, then centerline 35 is parallel to centerline 36. In FIGS. 8 and 9, centerlines 35 and 36 are parallel because bolt 25 was removed from the apparatus of FIG. 2, arms 21, 22 were rotated about pin 24 until arms 21, 22 were parallel to arm 18, and bolt 25 was inserted through apertures 23A (FIG. 2) in arms 21, 22 and, through aperture 26 colinear with apertures 23A.

In FIG. 8, the circular peripheral edge 29 of each disk 30 lies in a vertical plane 41 or 42 which is perpendicular to the plane of the paper on which the drawings are inscribed. Line 40 represents a plane which is perpendicular to the plane of the paper on which the drawings are inscribed. Plane 40 passes through "pinch point" P and bisects the angle between vertical planes 41 and 42. The pinch point P is the point of closest approach of the circular edges 20 of a disk pair 30. In FIGS. 1–5, 7A, 7C, 8, 9 the edges 29 of the disk pair 30 touch each other at pinch point P. In FIGS. 8 and 9, the pinch point P of the bed leveling disks 30 is located at the foremost point through which the edge 29 travel during rotation of disks 30 on joint 34. The pinch point in FIGS. 8 and 9 is also located a height above reference line 44 which is equal to one-half of the diameter of disk 30. FIG. 9 is a side view of the disk pair of FIG. 8 taken from the perspective indicated by arrow E.

The position of the bed leveling disks 30 in FIGS. 8 and 9 is termed the bed leveling disk reference position. If arms 21 and 22 and disks 30 carried thereon are rotated about pivot pin 24 in the direction indicated by arrows F and G in FIG. 9, then the disk pair is being forwardly canted. If arms 21 and 22 and disks 30 carried thereon are rotated about pivot pin 24 in directions opposite those indicated by arrows F and G in FIG. 9, then the disk pair is being rearwardly canted from the bed leveling disk reference position. In the practice of the invention, the bed leveling disk pair is forwardly canted. In FIGS. 2 to 5, the disk pair 30 is forwardly canted.

Arrows 45 in FIG. 9 indicated the shortest horizontal distance of pinch point P from axis 36. This distance is ordinarily three to eleven inches when disks 30 each have a twenty-four inch diameter. The diameter of disks 30 is preferably eighteen to twenty-four inches.

When the disk pair in the bed leveling apparatus of FIGS. 8 and 9 is forwardly or rearwardly canted, the centerpoint 46 of each disk 30 moves along an arc which lies in a plane parallel to plane 40 and perpendicular to the plane of the paper on which the drawings are inscribed. When the disk pair of bed leveling apparatus is in the orientation illustrated in FIG. 8, the disk pair is in a V-shaped orientation in which the disks rearwardly diverge from one another. In FIG. 8, the normal forward direction of travel of the bed leveling apparatus is indicated by arrow T. Point 40 is rearward of disks 30 while point 41 is forward of the disk pair. When the disk pair of FIGS. 8 and 9 is forwardly canted then, as would be appreciated by those of skill in the art, the disk pair diverges rearwardly and upwardly.

Bed shaping and contouring disks 30 are carried on bar 20. The orientation, size, construction, etc. of disks 30 carried on bar 20 is identical to that just described for the bed leveling disk pairs carried on bars 18 and 19. However, the amount by which the disk pair on bar 20 is forwardly canted may vary from the amount by which the disk pairs on bars 18 and 19 are forwardly canted. In particular, the disk pair in FIGS. 3 and 4 is more forwardly canted than is the disk pair in FIGS. 2 and 6. It is sometimes preferable to use the cant of FIG. 2 for the bed leveling disk pairs, and to use the greater forward cant of FIG. 3 for the bed contouring disk pairs.

FIGS. 10 and 11 illustrate a root cutting disk pair which is, as are the bed leveling and bed contouring disk pairs, mounted on a pair of upstanding arms 21, 22. In FIG. 10, convex face 32 is the outer face of a disk 30, while concave face 31 is the inner face of a disk 30. In other words, the disks 30 in FIGS. 10 and 11 have been "flipped" or rotated 180 degrees from the position of the disks in FIGS. 1 to 5. FIG. 11 is a side view of the disk pair of FIG. 10 taken from the position indicated by arrow J. As indicated in FIGS. 10 and 11, the cutting edge 29 of one disk 30 contacts and rolls over the concave inner face 31 of the other disk 30 in the disk pair. The "pinch point" P at which the peripheral edge 29 of one disks rolls over the inner concave face of the other disk is beneath the surface of the bed 50 as indicated in FIG. 10.

In FIG. 10, planes passing through the circular peripheral edges of disks 30 are perpendicular to the plane of the paper on which the drawings are inscribed. Line 53 represents a vertical plane which is generally perpendicular to the ground and bed 50, bisects the angle between planes 51 and 52, and passes through pinch point P.

In both FIG. 10 and FIG. 11, arms 21 and 22 are vertically oriented and axis 35 of arms 21 and 22 is parallel to axis 36 of an arm 18. The position of the root cutting disk pair of FIGS. 10 and 11 is called the root cutting disk reference position. If arms 21 and 22 and disks 30 carried thereon are rotated about pivot pin 24 in the direction indicated by arrows I and H in FIG. 11, then the disk pair is being forwardly canted. If arms 21 and 22 and disks 30 carried thereon are rotated about pivot pin 24 in directions opposite those indicated by arrows H and I in FIG. 9, then the disk pair is being rearwardly canted from the root cutting disk reference position. In the practice of the invention, the root cutting disk pair is forwardly canted. Arrows 60 in FIG. 11 indicated the shortest horizontal distance of pinch point P from axis 36 when the disk pair is forwardly canted. The distance indicated by arrow 60 is usually greater than zero inches and less than three inches when disks 30 have an outer diameter of twenty-four inches, and is preferably one to three inches. Root cutting disks preferably have an outer diameter of eighteen to twenty-four inches.

When the disk pair in the root cutting apparatus of FIGS. 10 and 11 is forwardly or rearwardly canted, the centerpoint 46 of each disk moves along an arc which lies in a plane parallel to plane 53 and perpendicular to the plane of the paper on which the drawings are inscribed. When the disk pair of the root cutting apparatus in the orientation illustrated in FIGS. 10 and 11, the disk pair is in a V-shaped direction in which the disks upwardly diverge from one another. When the disk pair of FIGS. 10 and 11 is forwardly canted then the disk pair diverges forwardly and upwardly. In FIG. 11 point 40 is rearward of disks 30 while point 41 is forward of the disk pair.

In FIG. 6, the depth M of the centerpoint of disk 30 is 0.75 to 1.50 inches, while, as noted, the diameter N is preferably eighteen to twenty-four inches.

In use, root cutting disk pair apparatus of the type illustrated in FIGS. 10 and 11 are mounted on a bar 11 and moved along the tops of parallel spaced apart beds 50 in a field to cut the roots of cotton stalks or other plants in the beds. Movement of the root cutting disk pair apparatus through a bed 50 is illustrated in FIGS. 10 and 11. As is depicted in FIG. 10, the pinch point P, the point where the peripheral cutting edge of one disk 30 rolls over the inner concave face 31 of the other disk, is below the surface of a bed 50. Root cutting disk pair apparatus typically removes a three inch thick layer of soil from the top of a bed 50. In FIG. 10, "pinch rod" 70 and bolts 71 turned thereon prevent arms 21, 22 and disks 30 from being forced outwardly away from one another when roots pass over pinch point P intermediate cutting edge 29 and concave inner surface 31.

When root cutting disk pairs, bed leveling disk pairs, and bed contouring disk pairs are moved over the elongate parallel beds of a field, they generally travel down the centers of the beds in a direction of travel parallel to the elongate axis of the beds. Accordingly, in FIG. 7A, the elongate centerline axes 71 of beds 50 are perpendicular to the plane of the paper on which the drawings are inscribed.

After the root cutting disk pair apparatus has been moved over beds 50, the apparatus of FIG. 1 is moved through the field by a tractor or other means in the manner indicated in FIGS. 7A and 7C. When the bed leveling disk apparatus shown in FIG. 7A moves over and through the top portions of beds 50, it throws dirt and cut stalks outwardly from the top of beds 50 in the manner indicated by arrows X and into the furrows 51 on either side of each bed 50. The root cutting disk pairs typically remove a depth of approximately three inches of dirt and cut stalk material from the top of each bed 50. In FIG. 7A the pinch point P of each disk pair lies along horizontal reference line 72. The height and position of the pinch points P in FIG. 7A corresponds to the height and position of the pinch point P shown in FIG. 2.

After the bed leveling disk pair apparatus has moved over beds 50, the bed contouring disk apparatus moves through furrows 51 and throws dirt upwardly in the direction of arrows Z onto beds 50. See FIG. 7C. In FIG. 7C, the disks 30 also function to shape and contour the side walls of beds 50. In FIG. 7C the pinch point P of each disk pair lies along horizontal reference line 73. The height and position of the pinch points P in FIG. 7C corresponds to the height and position of the pinch point P shown in FIG. 3.

It is preferred that the inner concave surface 31 of each disk approximate a portion of a sphere and generally by arcuate over the entire surface. When disk 30 is formed in the manner indicated by dashed line 30A in FIG. 8, the central area of inner surface 31A is flat, and is not arcuate and concave. Disks 30A, particularly when they are utilized in the root cutting disk apparatus of FIGS. 10 and 11, do not maintain their rigidity as well as a concave disk 30.

The amount of forward cant of root cutting disk pairs, bed leveling disk pairs, and bed contouring disk pairs varies according to the condition of the beds in the field. The pinch point P of the bed leveling disk pairs is usually relatively high above the ground when the bed contouring disk pair is traveling down a bed 50 having cotton stalks, the roots of which were cut with the root cutting disk pair of FIG. 10. The pinch point P of the bed contouring disk pair is high to prevent cotton stalks from traveling or falling over the pinch point P into the space intermediate the disk pair. Further, as would be appreciated by those of skill in the art, adjusting the position of the pinch point P alters the width of the swath of dirt displaced or worked by a disk pair. Accordingly, the ability to readily adjust the position and pinch point P of a disk pair is important in the practice of the invention, and is one of the significant features of the invention.

The kind and degree of concavity of each disk, the angle between the disks in a disk pair, the location of the pinch point P of a disk pair, and the sizing of the disks are all important factors in the efficient functioning of the apparatus of the invention.

Having described my invention in such terms as to enable those skilled in the art to understand and practice it, and having identified the presently preferred embodiments thereof, I claim:

1. A method for cutting the roots of plant stalks in the bed of a field, for leveling the bed, and for rebuilding and contouring the bed, comprising the steps of
   (a) moving root cutting apparatus along the bed in a selected direction of travel, said root cutting apparatus including (i) a frame adapted to be moved along the ground in a selected direction of travel;
(ii) upstanding arm means mounted on said frame and having a lower end;
(iii) a pair of forwardly canted ground engaging disks each rotatably mounted on said lower end of said upstanding arm means, said disk being mounted on said arm means in V-shaped relationship with respect to one another, each of said disks upwardly diverging from the other, and having an outer circular peripheral cutting edge and a concave inner face and a convex outer face, said cutting edge of one of said disks rotating over and contacting said inner face of the other said disks beneath the surface of the ground to cut stalk roots and lift cut stalks as said disks rotate along and through the ground when said apparatus is moving in said selected direction of travel, each of said disks being forwardly canted with respect to a reference position, said reference position of said disks comprising the position in which the point of contact of said cutting edge of said one of said disks with said inner face of the other said disks is generally the lowest point through which said cutting edge of said one of said disks passes during rotation thereof, said disks being forwardly canted when said disks are displaced such that the centerpoint of each disk moves upwardly a selected distance along an arc lying in an imaginary vertical plane generally parallel to said direction of travel;

(b) moving bed leveling apparatus along the bed to remove dirt and stalks from the top of the bed into the furrows on either side of said bed, said bed leveling apparatus including
(i) a second frame adapted to be moved along the ground in said selected direction of travel,
(ii) upstanding second arm means mounted on said second frame and having a lower end,
(iii) a pair of forwardly canted ground engaging disks each rotatably mounted on said lower end of said upstanding second arm means, said bed leveling disks being mounted on said second arm means in a V-shaped relationship with respect to one another, each of said bed leveling disks rearwardly diverging from the other, and having an outer circular peripheral edge and a concave outer face and a convex inner face, said bed leveling disks rotating through said bed to displace dirt and stalks from said bed outwardly into the furrows on either side of the bed when said bed leveling apparatus is moving in said selected direction of travel, each of said leveling disks being forwardly canted with respect to a bed leveling disk reference position, said bed leveling disk reference position comprising the position in which the point of closest approach of said peripheral edge of one of said bed leveling disks with said peripheral edge of the other of said bed leveling disks is generally at the frontmost point which said peripheral edge of said disk passes during rotation thereof, said bed leveling disks being forwardly canted when said disks are displaced such that the centerpoint of each disk moves downwardly a selected distance along an arc lying in an imaginary vertical plane generally parallel to said direction of travel; and, (c) moving bed contouring apparatus along at least one of said furrows to move dirt onto and shape said bed, said bed contouring apparatus including
(i) a third frame adapted to be moved along the ground in said selected direction of travel,
(ii) upstanding third arm means mounted on said third frame and having a lower end,
(iii) a pair of forwardly canted ground engaging disks each rotatably mounted on said lower end of said upstanding third arm means, said bed contouring disks being mounted on said third arm means in V-shaped relationship with respect to one another, each of said bed contouring disks rearwardly diverging from one another, and having an outer circular peripheral edge and a concave outer face and a convex inner face, said bed contouring disks rotating through said furrow to displace dirt from said furrow upwardly onto said bed when said bed contouring apparatus is moving in said selected direction of travel, each of said bed contouring disks being forwardly canted with respect to a bed contouring disk reference position, said bed contouring disks reference position comprising the position in which the point of closest approach of said peripheral edge of one of said bed contouring disks with said peripheral edge of the other of said bed contouring disks is generally at the frontmost point which said peripheral edge of said bed contouring disk passes during rotation thereof, said bed contouring disks being forwardly canted when said disks are displaced from the bed contouring disk reference position such that the centerpoint of each disk moves downwardly a selected distance along an arc lying in an imaginary vertical plane generally parallel to said direction of travel.

2. The method of claim 1 wherein said stalks have a thickness in the range of 0.5 to 2.0 inches.

3. The method of claim 2 wherein said stalks are cotton stalks.

4. The method of claim 1 wherein the angle between said root cutting disks is in the range of 66 degrees to 86 degrees.

5. The method of claim 4 wherein the angle between said bed leveling disks is in the range of 50 degrees to 64 degrees.

6. The method of claim 5 wherein the point of closest approach of said forwardly canted bed leveling disks is intermediate the frontmost point at which said peripheral edges of said bed leveling disks pass during rotation thereof and the lowermost point at which said peripheral edges of said bed leveling disks pass during rotation thereof.

7. A method for cutting the roots of plant stalks in the bed of a field, comprising the step of moving root cutting apparatus along the bed in a selected direction of travel, said root cutting apparatus including
(a) a frame adapted to be moved along the ground in a selected direction of travel;
(b) upstanding arm means mounted on said frame and having a lower end;

(c) a pair of forwardly canted ground engaging disks each having a diameter in the range of eighteen to twenty-four inches and rotatably mounted on said lower end of said upstanding arm means, said disk being mounted on said arm means in V-shaped relationship with respect to one another, each of said disks upwardly diverging from the other, and having an outer circular peripheral cutting edge and a concave inner face and a convex outer face said edge lying in a plane perpendicular to a third plane, the angle between said disks being in the range of thirty-four to forty-two degrees, said cutting edge of one of said disks rotating over and contacting said inner face of the other said disks beneath the surface of the ground to cut stalk roots and lift cut stalks as said disks rotate along and through the ground when said apparatus is moving in said selected direction of travel, each of said disks being forwardly canted with respect to a reference position, said reference position of said disks comprising the position in which the point of contact of said cutting edge of said disks with said inner face of the other said disks is generally the lowest point through which said cutting edge of said one of said disks passes during rotation thereof, said disks being forwardly canted when said disks are displaced such that the centerpoint of each disk moves upwardly a selected distance along an arc lying in an imaginary vertical plane generally parallel to said direction of travel, said disks being forwardly canted such that the shortest distance between a vertical line passing through said contact point when said root cutting disks are in said reference position, and a vertical line passing through said contact point when said root cutting disks are canted, is in the range of one to three inches.

* * * * *